(12) United States Patent
Wannowsky

(10) Patent No.: US 12,497,196 B2
(45) Date of Patent: Dec. 16, 2025

(54) GOODS TRANSPORT BY MEANS OF UNMANNED AIRCRAFT AND TRANSPORT CONTAINERS

(71) Applicant: THETA-SPACE GmbH, Berlin (DE)

(72) Inventor: Marcel Wannowsky, Berlin (DE)

(73) Assignee: THETA-SPACE GmbH, Berlin (DE)

(*) Notice: Subject to any disclaimer, the term of this patent is extended or adjusted under 35 U.S.C. 154(b) by 78 days.

(21) Appl. No.: 18/266,656

(22) PCT Filed: Dec. 17, 2021

(86) PCT No.: PCT/DE2021/101016
§ 371 (c)(1),
(2) Date: Jun. 12, 2023

(87) PCT Pub. No.: WO2022/128000
PCT Pub. Date: Jun. 23, 2022

(65) Prior Publication Data
US 2024/0043143 A1 Feb. 8, 2024

(30) Foreign Application Priority Data

Dec. 18, 2020 (DE) .......................... 102020134237.3

(51) Int. Cl.
*B64U 10/14* (2023.01)
*B64U 101/60* (2023.01)
(Continued)

(52) U.S. Cl.
CPC .......... *B64U 10/14* (2023.01); *B64U 2101/60* (2023.01); *B65D 25/04* (2013.01); *B65D 55/00* (2013.01)

(58) Field of Classification Search
CPC .... B64U 10/14; B64U 2101/60; B65D 25/04; B65D 55/00
(Continued)

(56) References Cited

U.S. PATENT DOCUMENTS 9,487,356 B1 11/2016 Aggarwal et al.
9,714,139 B1 7/2017 Aggarwal et al.
(Continued)

FOREIGN PATENT DOCUMENTS

JP 2019194083 A 11/2019

OTHER PUBLICATIONS

International Search Report for PCT/DE2021/101016 dated Mar. 14, 2022.
(Continued)

*Primary Examiner* — Daniel A Hess
(74) *Attorney, Agent, or Firm* — Millen, White, Zelano & Branigan, P.C; Brion P. Heaney

(57) ABSTRACT

The invention relates to the transport of goods by means of an unmanned aerial vehicle (3) and a transport container (2), as well as to the possibility of the receipt of the goods by means of a goods station (29). In order to be able to transport the goods flexibly and easily to a destination, it is envisaged in accordance with the invention that the unmanned aerial vehicle (3), and/or the transport container (2), and/or the goods station (29), comprise data storage devices (4, 6) and are configured to exchange data from the data storage devices (4, 6) with one another, or with a transport logistics server.

22 Claims, 7 Drawing Sheets

(51) Int. Cl.
  *B65D 25/04* (2006.01)
  *B65D 55/00* (2006.01)
(58) Field of Classification Search
  USPC .......................................................... 235/10
  See application file for complete search history.

(56) References Cited

U.S. PATENT DOCUMENTS

| | | |
|---|---|---|
| 11,480,958 B2* | 10/2022 | Paczan .................... B64C 37/02 |
| 2015/0120094 A1 | 4/2015 | Kimchi et al. |
| 2017/0110017 A1 | 4/2017 | Kimchi et al. |
| 2019/0066032 A1 | 2/2019 | Taveira et al. |
| 2019/0161190 A1 | 5/2019 | Gil et al. |
| 2019/0347942 A1 | 11/2019 | Kimchi et al. |
| 2020/0031460 A1* | 1/2020 | Millhouse ............ G06Q 10/083 |
| 2020/0354109 A1 | 11/2020 | Polus et al. |
| 2022/0058965 A1 | 2/2022 | Kimchi et al. |

OTHER PUBLICATIONS

Office Action for Related German Application No. 102020134237.3 dated Jul. 9, 2021.
English Abstract of JP2019194083, Publication Date: Nov. 7, 2019.

* cited by examiner

GOODS TRANSPORT BY MEANS OF UNMANNED AIRCRAFT AND TRANSPORT CONTAINERS

TECHNICAL FIELD

The present invention relates to the field of the transport of goods by means of unmanned aerial vehicles, which can also be referred to as transport drones, and transport containers. In particular, the invention relates to a transport container for a system for the transport of goods, whereby the transport container is configured to receive the goods to be transported. Furthermore, the invention relates to an unmanned aerial vehicle for a system for the transport of goods, wherein the aerial vehicle is configured to transport a transport container for the goods. The invention also relates to a system for the transport of goods. In addition, the invention relates to a method for the transport of goods from a receiving location to a destination, whereby the goods are arranged in a transport container at the receiving location, and the transport container is transported to the destination by an unmanned aerial vehicle. Finally, the invention relates to a goods station for a system for the transport of goods, wherein the goods station is configured for the receipt and discharge of goods.

TECHNOLOGICAL BACKGROUND

An unmanned aerial vehicle for the transport of goods, for example a transport drone, is preferably an aerial vehicle that can fly automatically or autonomously, that is to say, without a pilot, either on board the aerial vehicle, or external to the aerial vehicle, from one location to another location, and can determine the route between these locations, possibly entirely, or at least partially, without a route specification.

Transport containers are in general of known art. Destination data, which represent a destination of a transport container, are usually printed on an adhesive label, which in turn is adhesively bonded onto the transport container. Unmanned aerial vehicles, for example drones, are also in general of known art, and are usually controlled remotely. Furthermore, there are unmanned aerial vehicles of known art that fly autonomously, and into which a destination or a flight route can be entered manually. However, the printing and the manual application of the adhesive label, and the manual input of the data into the unmanned aerial vehicle, are tedious.

PRESENTATION OF THE INVENTION

It is an object of the invention to simplify, and render more secure, the transport of goods by means of unmanned aerial vehicles and transport containers, together with goods stations.

This object is achieved for the transport container referred to at the outset, in that the transport container has a data storage device and, connected to the data storage device in a data transmitting manner, a communications device for exchanging data with a communications device of an unmanned aerial vehicle of the transport system, wherein the data storage device has an receipt data storage region, which is reserved for data that represent a receiving location at which goods are to be accepted by the transport container, and/or in that the data storage device has a destination data storage region, which is reserved for data representing a destination to which the goods are to be delivered. For the unmanned aerial vehicle referred to at the outset, the object is achieved in that the aerial vehicle has a data storage device, and, connected to the data storage device in a data transmitting manner, a communications device for exchanging data with a communications device of a transport container of the transport system that is to be transported, wherein the data storage device has a receipt data storage region, which is reserved for data representing a receiving location, to which the aerial vehicle is to fly for purposes of accepting goods, and/or that the data storage device has a destination data storage region, which is reserved for data representing a destination, to which the aerial vehicle is to fly for purposes of delivering the goods. For the system referred to at the outset, the object is achieved in that the system has at least one transport container in accordance with the invention, and at least one unmanned aerial vehicle in accordance with the invention, and optionally at least one goods station in accordance with the invention. Furthermore, the object is achieved for the method referred to at the outset in that the transport container is a transport container in accordance with the invention, and/or the aerial vehicle is an aerial vehicle in accordance with the invention. Finally, the object is achieved for the goods station referred to at the outset in that the goods station has a data storage device and, connected to the data storage device in a data transmitting manner, a communications device for data exchange with a communications device of a transport container and/or of an unmanned aerial vehicle of the system, wherein the data storage device of the goods station has an authentication data storage region, which is reserved for authentication data, which identify the goods station to the transport container, and/or to the aerial vehicle, as the recipient of the goods.

Since the transport container and the aerial vehicle each have a communications device and can exchange data with each other by way of the communications device, the transport container and the aerial vehicle can automatically exchange with each other the receiving locations and/or destinations that are important for the transport of the goods, so that no manual entries are necessary. In particular, data relating to receiving locations and/or destinations can be entered into the data storage device of the transport container, for example when it is, has been, or is to be, filled with the goods to be transported. If an aerial vehicle is assigned to the transport container, either logically, or during the coupling of the transport container to an aerial vehicle, a transmission of the data to the aerial vehicle can take place automatically during or after the assignment.

The solution can be further improved by various embodiments, each of which being advantageous in itself, and, unless otherwise specified, can be combined with each other as required. These embodiments and the advantages associated with them are discussed in what follows.

In accordance with a first embodiment of the transport container, the communications device of the transport container is configured to exchange data with the communications device of the aerial vehicle directly, or via a transport logistics server.

In accordance with a first embodiment of the aerial vehicle, the communications device of the aerial vehicle is configured to exchange data with the communications device of the transport container directly, or via a transport logistics server.

The transport logistics server can have a computer, or a computer network, that stores logistical data, such as data as to which goods are when to be transported from the receiving location to the destination, and transmits at least the data relating to the receiving location, and/or the destination, to the transport container, and/or to the aerial vehicle, or from the transport container to the aerial vehicle, as required.

An advantage of this embodiment can be that no transport logistics server is required for direct transmission, so that the transport container and/or the aerial vehicle can be operated with little effort and, for example, also by smaller businesses or by private individuals. The transport logistics server can be advantageous if a large number of transport containers and/or aerial vehicles are to be operated, for example, by an online store such as Otto or Amazon.

In accordance with a further embodiment of the transport container, the transport container has a control device, which is connected to electromechanical, electrical, electronic, and/or sensor devices of the transport container in a signal transmitting manner. In accordance with an embodiment of the transport container, the transport container can have a data processing device that is configured to recognise, and/or process in real time, sensor signals from a sensor of the transport container or the aerial vehicle, authentication data of the goods station, or from another station, or from a person that wishes to receive the goods, goods data that are associated with a data carrier (bar code, two-dimensional code, RFID data carrier) that is attached to one of the goods.

The sensor can, for example, be an altitude sensor that generates a signal that is representative of the flight altitude. Alternatively or additionally, a sensor can be provided, whose sensor signal represents the internal temperature of the transport container, and/or the external temperature of the environment of the transport container. Furthermore, alternatively or additionally, a sensor can be provided that is configured to convert the authentication data, and/or the goods data, into a sensor signal.

The sensor and, for example, the temperature sensor, and/or the height sensor, can be arranged in the interior of the transport container, or on the outer surface of the transport container. The goods data can represent storage conditions, such as the minimum and/or maximum storage temperature to be maintained during transport, and/or other information, such as the fact that the goods can only be permitted to accelerate up to a maximum predefined limiting value, in order to avoid damage. Additionally or alternatively, the goods data can represent warning instructions, such as when the goods are subject to a hazard classification, such as when corrosive or flammable goods, or goods containing a battery, are being transported. Additionally or alternatively, the goods data can represent condition data, whereby the condition of the goods being transported can be, for example, their weight, and/or as to whether the goods are filled, partially filled, or not filled at all, with a fluid.

In particular, sensor data can be selected sensor data, or can be all the sensor data, which can be used for maintenance of the transport container, and/or the aerial vehicle. Sensor data that can be used for maintenance can be, for example, the goods data, for example if these represent the weight of the goods, and parts of the transport container and/or the aerial vehicle that are to be maintained if they are loaded with a goods weight that lies above a predefined limiting value. In addition, sensor data that can be used for maintenance can also be data concerning the malfunctioning of mechanical and/or electronic mechanisms.

The data processing device can be directly connected to at least one sensor, or a plurality of sensors in a sensor signal transmitting manner. Alternatively or additionally, the data processing device can be connected to the control device in a signal transmitting manner. The data processing device can be formed separately from the control device, or can be integrated into the control device.

In accordance with a further embodiment of the transport container, the data storage device has a base data storage region, in which data representing a base location, to which the transport container is to be returned after a delivery, or for which the goods are intended, are permanently stored. "Permanent storage" can mean that the data are stored such that they cannot readily be altered, or are stored in a non-volatile manner.

In accordance with a further embodiment of the aerial vehicle, the data storage device has a base data storage region in which data representing a base location, to which the aerial vehicle is to return after a delivery, or to which the aerial vehicle is to transport the goods, are permanently stored. "Permanent storage" can mean that the data are stored such that they cannot readily be altered, or are stored in a non-volatile manner.

An advantage of this embodiment can be that the transport container and/or the aerial vehicle can transport goods from a receiving location to a destination, whereby the base location is neither the receiving location nor the destination. Thus, the transport container and/or the aerial vehicle can be kept and/or maintained and, for example, charged, at a location that can be the base location, and can readily return to the base location if so required, such as when the battery charge falls below a lower limiting value.

Another advantage can be that the base location can be the residence of a private person. The place of residence can be the permanent residence, or a temporary residence, that is to say, a residence for a limited period of time, such as a holiday residence. The aerial vehicle and/or the transport container can then, for example, transport purchases for the private person, and may possibly collect them from a retailer (such as a supermarket) without the private person being present. The destination can then correspond to the base location, for example. Alternatively, the destination can be a location other than the destination, and can, for example, be the home of an acquaintance or a relative of the private person. Employees of the retailer can arrange the goods in the transport container.

In accordance with a further embodiment, the data storage device is an electronic data storage device.

In accordance with a further embodiment of the transport container, the transport container has an attachment device for the repeatedly releasable attachment of the transport container to an aerial vehicle in accordance with the invention.

In accordance with a further embodiment of the aerial vehicle, the aerial vehicle has a mating attachment device for the repeatedly releasable attachment of the aerial vehicle to a transport container in accordance with the invention.

An advantage of these embodiments can be that the transport container can be transported with different aerial vehicles in accordance with the invention. Furthermore, without an aerial vehicle being attached to the transport container, the transport container can be more easily stored, and, for example, stacked and possibly at least partially inserted into another transport container, thereby reducing the storage space required for a plurality of transport containers.

In addition, without a transport container attached to the aerial vehicle, the aerial vehicle can be easier to store and, for example, to stack, thereby reducing the storage space required for a plurality of aerial vehicles.

In accordance with a further embodiment of the transport container, the transport container has a removal opening, a closure device, and a control device, whereby the control device is configured electively to control the closure device such that it either fixedly closes or releases the removal opening.

The transport container can have a plurality of removal openings, whereby one of the removal openings can be arranged on an upper face or lower face of the transport container, and another of the removal openings can be arranged on a lateral face connecting the upper face with the lower face. A plurality of removal openings can be arranged on one, or on various, lateral faces. A plurality of removal openings can be arranged on the upper face, and/or on the lower face.

An advantage of this embodiment can be that goods in the transport container are secured against unauthorised removal, and can only be removed when the control device releases the locking device to open the removal opening. The control device can do this, for example, at the destination, or after entering a predefined authentication, or a predefined release code.

Furthermore, in accordance with another embodiment, the transport container can have a loading opening, through which goods can be arranged in the transport container. The loading opening can correspond to the removal opening, or can be configured to be spaced apart from the removal opening. The loading opening can, for example, be arranged opposite the removal opening.

An advantage of this embodiment can be that goods can easily be arranged in the transport container.

In accordance with a further embodiment of the transport container, the closure device is motor-driven. A motor of the closure device can be connected to the control device in a control signal transmitting manner.

An advantage of this embodiment can be that the removal opening can be opened automatically, for example when reaching the destination, or after entry of the authentication or release code, and by this means the transport container can be used more easily.

In accordance with a further embodiment of the transport container, the transport container can have an authentication device, with which the recipient can authenticate. The authentication device can, for example, have a card reader, an RFID reader, a code entry device, or the like, and can be connected to the control device of the transport container in an authentication signal transmitting manner.

In accordance with a further embodiment of the transport container, the removal opening can be arranged on, or in, a floor of the transport container.

An advantage of this embodiment can be that the transport container only needs to be lifted in order to remove the goods when the closure device is released. The transport container can, for example, be lifted by a person, or by the aerial vehicle in order to remove the goods. The aerial vehicle can, for example, hold the transport container in a hovering state a few centimetres above the ground, in order to deposit goods on the ground.

In accordance with a further embodiment of the transport container, the removal opening is covered by the closure device in the closed state of the closure device, whereby the removal opening is uncovered or exposed by the closure device in the open state of the closure device, that is to say, is accessible from the exterior.

An advantage of this embodiment can be that the goods can be removed easily, and possibly without the need for a person or a machine.

In accordance with a further embodiment of the transport container, the closure device has at least one closure element which electively closes or releases the removal opening, and which can be moved or pushed parallel to the removal opening. The closure element can be formed, for example, as a roller blind, or as a roller shutter, or with slats, or with plates that are pivotably attached to one another. If the closure element has slats, at least some of the slats can extend parallel to the removal opening in the closed state. The slats can thus be arranged, at least partially, in a plane that runs parallel to the removal opening when the closure element is closed. The closure device can be configured to move or push the closure element in a motorised manner, for example automatically.

An advantage of this embodiment can be that the closure element, which can be moved or pushed parallel to the removal opening, requires little space inside and outside the transport container for its transfer from its closed position, in which it covers the removal opening and thereby closes it, to its open position, in which the removal opening is uncovered, exposed or accessible from the environment, so that the storage space for goods inside the transport container is not unnecessarily restricted. Furthermore, the closure element can be moved from its closed position to its open position even if the transport container is standing on a base and the removal opening is provided on the floor of the transport container.

In accordance with a further embodiment of the transport container, the closure element has a front surface which is wedge-shaped, and tapers towards the free end of the closure element. In particular, the front surface can have an edge at its thinnest point, which can run parallel to the removal opening, and/or at right angles to the direction of movement of the closure element.

An advantage of this embodiment can be that goods, for example from the goods station, can be received by the transport container without manual intervention, whereby the closure element can be pushed under the goods to be acquired by virtue of its wedge-shaped free end.

In accordance with a further embodiment of the transport container, the transport container has at least one partitioning element, for example a partition wall, with which the free volume of the transport container can be divided into two sub-volumes that are partitioned from each other. The transport container can be configured to position the partitioning element automatically so as to partition predefined compartments in the transport container from each other. Each of the compartments can contain one of the sub-volumes. For example, the transport container can have a positioning motor that is connected to the partitioning element, for purposes of transmitting movement.

An advantage of this embodiment can be that goods are not unintentionally mixed. and/or can be removed independently at different destinations.

In accordance with a further embodiment of the transport container, the partitioning element is motor-driven. The positioning motor driving the partitioning element can be connected to the control device in a control signal transmitting manner.

An advantage of this embodiment can be that the filling of the transport container with goods for different destinations, or with goods that should not be mixed with each other, can be automated.

In accordance with another embodiment of the transport container, the transport container has an attachment section, which is configured such that a mating attachment section of another transport container can be repeatedly releasably attached to the attachment section. The attachment section has, for example, a latching device or a gripping device, and the mating attachment section has a mating latching device or a mating gripping device.

An advantage of this embodiment can be that a plurality of transport containers can be coupled together or attached to each other, that is to say, connected to each other in a movement transmitting manner, for example, whereby the coupled or attached transport containers can be moved together with an aerial vehicle according to the invention. By this means, the total available loading volume can be increased. For example, each of the coupled or attached transport containers can have a loading volume that is separated from the loading volume of at least one other coupled or attached transport container. Alternatively or additionally, at least selected members of the coupled or attached transport containers can provide a common and/or continuous loading volume so as to be able to transport goods that would be too large to be transported in one of the transport containers.

In accordance with one possible embodiment, the aerial vehicle has at least one transport container according to the invention. The transport container, which is optionally integrally formed with the aerial vehicle, can be coupled to or can be attached to at least one further transport container according to the invention.

In accordance with a further embodiment of the aerial vehicle, at least one rotor of the aerial vehicle is provided on a movement mechanism, whereby the rotor can be pivoted with the movement mechanism from an operating position into a rest position, and vice versa, and whereby in its rest position the rotor is arranged in a housing of the aerial vehicle. The movement mechanism can be configured to move the rotor linearly from the rest position to the operating position, and vice versa, whereby the movement mechanism is, for example, configured to be telescopic for this purpose. Alternatively or additionally, the movement mechanism can be configured to pivot the rotor from the rest position to the operating position, and vice versa, whereby for this purpose the movement mechanism can have a pivoting mechanism, or can be a pivoting mechanism.

An advantage of this embodiment can be that during transport and/or storage of the aerial vehicle, the housing can accommodate the rotors in a space-saving manner and secured against damage. The housing can form the outer housing, or can be a part of the outer housing of the aerial vehicle.

In accordance with a further embodiment of the aerial vehicle, the housing is configured to close and uncover an upper opening of a transport container attached to the aerial vehicle.

An advantage of this embodiment can be that the transport container can easily be closed with the aerial vehicle, so that no separate cover is needed, which saves weight.

In accordance with a further embodiment of the aerial vehicle, the aerial vehicle has two independently operable and coupled aerial sub-vehicles, or -drones, in each case with a rotor. In the context of the aerial sub-vehicles, operable can mean that an aerial sub-vehicle has at least one rotor, and optionally a drive motor for driving the rotor, a flight control device for controlling the drive motor, and/or the data storage device and the communications device. Each of the aerial sub-vehicles can form a cover for a transport container. Unmanned aerial vehicles or aerial sub-vehicles forming a cover for a transport container can also be referred to as cover or lid aerial vehicles or drones.

If two aerial sub-vehicles are coupled together, for example, are attached to each other, the resulting aerial vehicle can carry a greater load than each of the aerial sub-vehicles alone.

The aerial sub-vehicles, without further aerial sub-vehicles, can also be used as aerial vehicles in accordance with the invention.

An advantage of this embodiment can be that goods whose weight would overwhelm a single aerial sub-vehicle can also be transported by adding at least one additional aerial sub-vehicle to the aerial vehicle. Goods whose weight can be handled by a single aerial sub-vehicle can be transported efficiently with just the one aerial sub-vehicle.

In accordance with a further embodiment of the aerial vehicle, all aerial sub-vehicles have the data storage device and the communications device. Alternatively, only one of the aerial sub-vehicles can have the data storage device and the communications device, and can be configured to control the at least one additional aerial sub-vehicle so that the aerial vehicle flies as planned. Furthermore, just one of the aerial vehicles can have a drive motor for driving the rotors of each of the aerial sub-vehicles, and the flight control device for purposes of controlling the drive motor.

An advantage of this embodiment can be that the costs of the additional aerial vehicles are lower.

In accordance with a further embodiment of the aerial vehicle, the rotor of one of the aerial sub-vehicles, in a coupled state of the aerial sub-vehicles, is arranged offset relative to the rotor of the other of the aerial sub-vehicles, such that the rotors rotate without making contact during operation of the aerial vehicle. For example, the rotor of one of the aerial sub-vehicles can be offset relative to the rotor of the other of the aerial sub-vehicles along or perpendicular to the plane of rotation of the rotors, and/or the pivot plane of the pivot axis. The offset can be configured to be linearly displaced, or rotated by up to, for example, 30°, 45°, 90°, 135°, or 180°. Alternatively or additionally, in a coupled state of the aerial sub-vehicles, the rotor of one of the aerial sub-vehicles can be linearly offset relative to the rotor of the other of the aerial sub-vehicles, that is to say, can be further away from the aerial vehicle than the rotor of the other aerial sub-vehicle.

An advantage of this embodiment can be that the rotors have as little adverse mechanical or aerodynamic influence on each other as possible, in order to improve the flight characteristics.

In accordance with a further embodiment of the aerial vehicle, both aerial sub-vehicles can have the housing, into which the at least one rotor can be pivoted or retracted.

In accordance with a further embodiment of the aerial vehicle, the aerial vehicle has a transport container, to which the aerial vehicle is permanently attached.

An advantage of this embodiment can be that a mechanically more complex form of releasable attachment of the transport container to the aerial vehicle is not required.

In accordance with a further embodiment of the transport container, the transport container can have a goods security device in its free volume, for purposes of securing goods in the free volume against transport damage. The goods security device can be elastically flexible, and/or soft, and can, for example, be configured as an air cushion that may possibly be inflated by the transport container. In accordance with a further embodiment of the transport container, the control device can be connected to the goods security device in a control signal transmitting manner, so as to activate the goods security device as required, for example in order to initiate the inflation of the air cushion. The air cushion can be located on an interior wall, which is arranged adjacent to the free volume. The transport container can have at least one inflatable air cushion on just one, on selected, and, for example, on opposing interior walls, or even on all interior walls. Additionally or alternatively, the partitioning device can have at least one inflatable air cushion on at least one of its faces, which can be adjacent to the free volume of a partitioned compartment.

The requirement can be determined by an operator, such as when the operator is concerned that the goods could be damaged during transport. Alternatively or additionally, the requirement can relate to the take-off of the aerial vehicle. If the requirement relates to the take-off of the aerial vehicle, the goods security device can be used for all goods in order to secure their position in the free volume during take-off, flight and/or landing of the aerial vehicle, which improves flight stability. Alternatively or additionally, the requirement can relate to the fact that a goods item has been placed in the transport container, or acquired from the transport container. In order to be able to detect that a goods item has been placed in, or received by, the transport container, the transport container can have a goods sensor, which can be, for example, a pressure sensor, an optical sensor, or an ultrasound sensor.

In accordance with a further embodiment of the transport container, the transport container can have a temperature control device, with which the temperature in the free volume of the transport container can be controlled, that is to say, it can, for example, be kept constant, increased, and/or decreased.

In accordance with a further embodiment of the transport container, the transport container can comprise a power supply for the provision of electrical energy, for example a generator, or a rechargeable battery. The power supply can be configured to supply electrical and/or electronic components of the transport container, and/or the aerial vehicle, with operating power. For example, the power supply can be configured to supply the drivetrain of the aerial vehicle completely or partially with drive power. For example, the power supply can provide additional drive power, for example to compensate for insufficient power to drive the aerial vehicle for the remaining flight, or to prevent a crash of the aerial vehicle.

In accordance with a further embodiment of the transport container, the transport container can comprise a fixedly mountable and repeatedly releasable cover, which can have a coupling element that is configured to be coupled to the aerial vehicle. The aerial vehicle can have a mating coupling element for the coupling element. Alternatively, the cover can be a non-removable integral component of the transport container. Furthermore, the cover can alternatively be a non-removable integral component of the aerial vehicle.

In accordance with another embodiment of the transport container, the transport container can have an inspection unit for purposes of checking the goods. The inspection unit can, for example, have a machine code reader, such as an optical bar code reader, or a data matrix code reader, or an RFID reader. The inspection unit can have the goods sensor in the form of an optical code reader, if the goods sensor is an optical sensor.

In accordance with a further embodiment of the transport container, the transport container can have a crash protection device, for example a parachute. The transport container can be configured to activate the crash protection device and, for example, to deploy the parachute, if the aerial vehicle can no longer properly keep the transport container in the air. The crash protection device can, for example, be activated if the flight capability of the aerial vehicle is impaired, or if the transport container detaches in an unplanned manner from the aerial vehicle during transport. With the aid of the crash protection device, the transport container, and optionally the aerial vehicle also, can be brought back to the ground safely and slowly enough to avoid damage. For example, the crash protection device can be arranged in the transport container and possibly in a separate free volume of the transport container. Alternatively or additionally, the aerial vehicle can have a crash protection device, for example a parachute. The crash protection device can be connected to the control device of the transport container and/or the aerial vehicle in a control signal transmitting manner. Alternatively or additionally, the transport container and/or the aerial vehicle can have a crash sensor, for example an altimeter, which is connected to the control device and/or the crash protection device in a sensor signal transmitting manner. If the crash sensor detects that the transport container and/or the aerial vehicle are descending faster than specified, the crash protection device can be activated.

In accordance with an embodiment of the goods station, the communications device of the goods station is configured to exchange data with the communications device of the aerial vehicle and/or of the transport container directly, or via a transport logistics server.

In accordance with a further embodiment of the method, the method can have at least some of the following method steps, if, for example, the method concerns the despatch of goods to a customer's location, or residence, as a destination. Selected steps, or all the steps, of the method, can be listed in the order as presented, or in a different order.

1. The customer orders goods online.
2. The customer confirms "home delivery" as the destination, (or selects another destination).
3. The order is received by the retailer.
4. The ordered product is picked out. (Picking)
5. The product is allocated an identification. (e.g. product X for Mrs Müller with mailbox-ID 123 and position 00).
6. The goods are arranged in the transport container, optionally the loading volume is expanded with another transport container, and the goods are then arranged in the loading volume of the expanded transport container. (Packing)
7. The transport container is identified/the goods are assigned to the transport container. (e.g. product X for Mrs Müller with mailbox-ID 123 . . . and position 00 lies in the transport container).
8. A cover is placed on the transport container, the cover and the transport container are fixedly connected together (the cover can have, or can be, an unmanned aerial vehicle).
8a. Optionally, another unmanned aerial vehicle is mechanically attached to the aerial vehicle fixedly connected to the transport container (the other aerial vehicle can, at least essentially, be the same as the first aerial vehicle).
9. The transport container is placed on a conveyor belt.
10. The transport container detects the goods in the interior space, the transport container creates just the loading volume required for the goods (it can have a plurality of goods for delivery to one location) by automatically inflating integrated air cushions.
11. The transport container is, e.g., transported to the take-off point (or stored in a transport vehicle and transported to the take-off point).

12. The rotors extend from the aerial vehicle.
13. The rotors start up and the box initiates its flight, controlled, e.g. by way of the server, to the specified location (to the customer). (Shipping)
14. Shortly before arrival, the transport container informs the recipient of the goods of the impending arrival.
15. The transport container flies to the location.
16. A goods station for the receipt and/or delivery of goods transmits an identifier to the transport container.
17. The transport container transmits the identifier to a transport logistics server.
18. The transport logistics server compares the identifier with a predefined identifier and, in the event that they match, issues a release for the goods to be delivered, the goods station opens an (upper) hatch, the transport container lands on, or hovers over, the goods station.
19. The transport container releases air from the air cushions, and opens a lower removal opening.
20. The goods are delivered to the goods station.
21. The transport container closes the removal opening, the goods station closes the hatch.
22. The transport container sends a message to the transport logistics server that the goods have been delivered to the goods station with ID 123, and optionally to position
23. The transport logistics server confirms delivery and instructs the at least one unmanned aerial vehicle to initiate the return flight.
24. The transport container returns to the head office/logistics centre.
25. The transport container lands, possibly on a conveyor belt, Rotors traverse/pivot into the unmanned aerial vehicle, optionally configured as a cover for the transport container.
26. The transport container reports arrival to the transport logistics server.
27. The transport logistics server confirms, archives/deletes data relating to the completed delivery, and sends a message to the transport container, and/or to the at least one unmanned aerial vehicle connected to the transport container, so as to decouple the at least one unmanned aerial vehicle from the transport container, and/or from the other unmanned aerial vehicle.
28. Aerial vehicle and transport container are unlocked.
29. The at least one unmanned aerial vehicle detaches from the transport container, optionally after the transport container with the at least one unmanned aerial vehicle has been transported, possibly by way of a conveyor belt, to a container collection point.
30. The transport container and the at least one unmanned aerial vehicle are separated from each other.

In accordance with a further embodiment of the method, the method can have at least some of the following method steps, if the method concerns, for example, the despatch of goods to a customer's location, or residence. In the following, only alternative method steps to the above method are described, which can replace method steps that can have the corresponding numbering, either individually or together.

15. The transport container flies to the destination, which corresponds to the recipient's location, for example, his/her residence. Optionally, the transport container lands there and the aerial vehicle's rotors are halted.
16. The recipient authenticates him/herself to the transport container.
17. The transport container transmits the authentication, e.g. customer-ID 123, to the transport logistics server.
18. The transport logistics server compares the authentication with a predefined authentication, and issues a release in the event that there is a match.

In accordance with a further form of embodiment of the method, the method can have at least some of the following method steps, for example, if the method concerns the return of goods, for example by a customer:

1. Customer opens, e.g. the server app, or the app of the online retailer, and logs in.
2. Customer notifies a return.
3. Customer identifies goods to be returned (e.g. by scanning the QR code on the goods, and reports the reason for return).
4. Customer places goods in goods station for purposes of receiving and/or delivering goods.
5. Customer confirms return.
6. Transport logistics server records return notification, and can access goods station position by way of logon data.
7. Transport container is identified, and/or the return of e.g. product X from Mrs Müller with mailbox-ID 123 and position 00 is assigned to the transport container.
8. A cover comprising an unmanned aerial vehicle is placed on the transport container, the cover and the transport container box are fixedly connected to each other (locking mechanism), or the loading volume is expanded with a further transport container, and, if necessary, the performance is enhanced by placing a further unmanned aerial vehicle, which can also be part of a cover, on the cover that is already present.

8a.-13. See above
14. Box flies to the customer's goods station and transmits notification of impending arrival to customer.
15.-17. See 16.-18. above
18. Goods station opens upper flap.
19. Transport container lands on goods station.
20. Transport container unlocks and opens lower hatch.
21. Goods are transferred from the goods station to transport containers, for example with the aid of the wedge function when closing the lower face.
22. Transport container closes lower hatch and locks. Goods station closes upper hatch.
23. Transport container transmits info to transport logistics server that the goods with ID 123 and position 00 have been picked up from the goods station.
24. Transport logistics server confirms return and initiates return flight.
25.-28. See 24.-26. above
29. Transport logistics server confirms receipt of return, archives/deletes data and transmits signal to transport container to decouple the aerial vehicle from the transport container.
30.-31. See 28.-29. Unlock cover and box.
32. Transport container is identified.
33. Aerial vehicle(s) and transport container(s) are separated from each other.
34. Employee receives information concerning return data.
35. Employee checks the integrity of the returned goods etc.
36. Employee identifies goods.
37. Return acquisition is confirmed, and remittance/refund/replacement is initiated.

38. Goods are returned to the warehouse.
39. Transport container and aerial vehicle are reused.

BRIEF DESCRIPTION OF THE FIGURES

For a better understanding of the present invention, reference is made in what follows to the figures. These show only exemplary embodiments of the subject-matter of the invention. Features of these exemplary embodiments can be combined independently of each other.

In the figures and the associated description, identical or similarly functioning parts are given the same reference symbols.

WAYS TO CARRY OUR THE INVENTION

As already explained at the outset, in accordance with the invention an unmanned aerial vehicle is provided, which in what follows is described, merely by way of example, as a transport drone. Other unmanned aerial vehicles, such as vertical take-off aircraft or helicopters, which fly unmanned, and whose size can be adapted to the transport containers to be transported, and to the spatial conditions, at least at the destination, can also be conceived in accordance with the invention. Such other unmanned aerial vehicles can have the features of the exemplary embodiments described.

Figure 1:
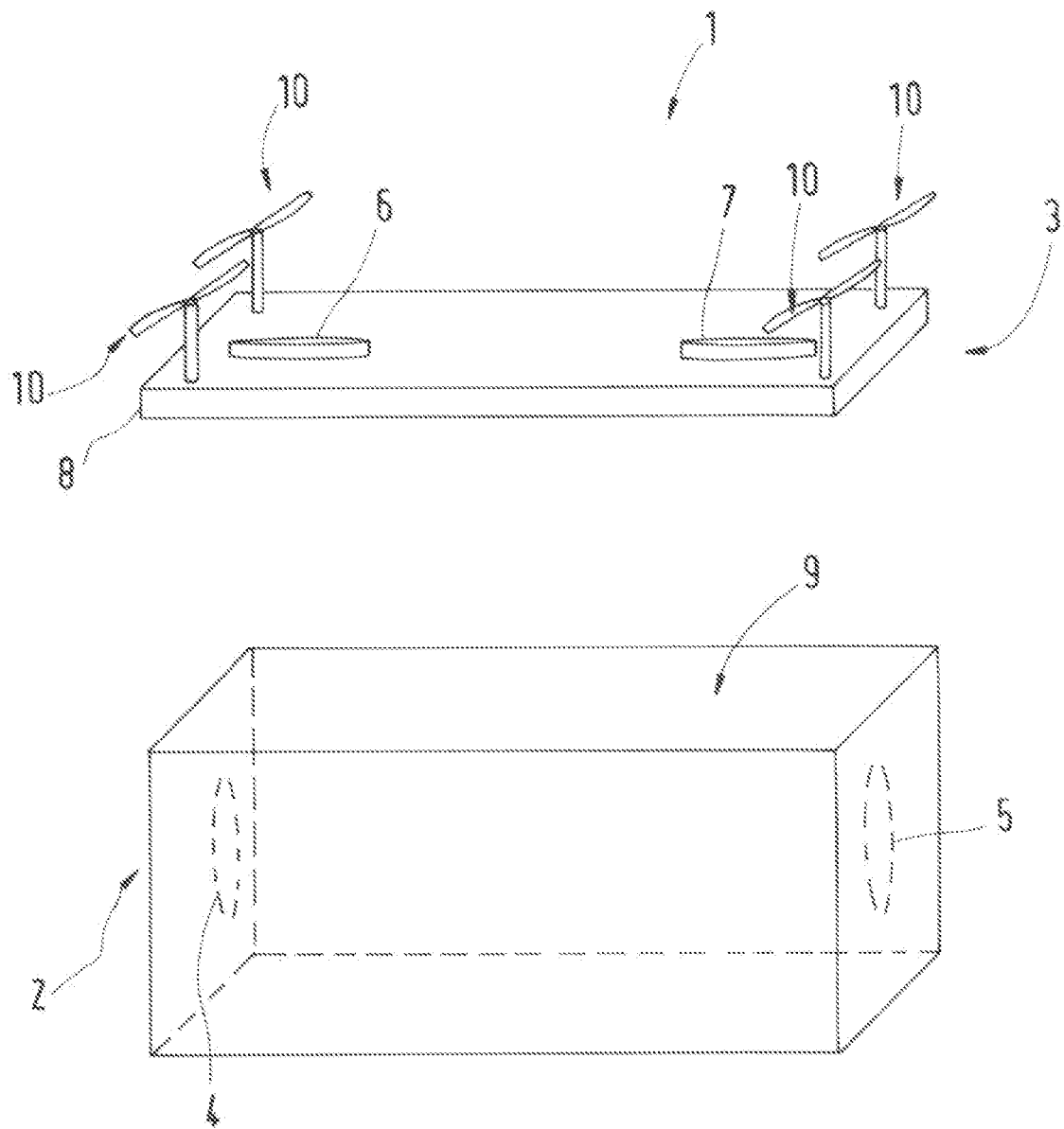
FIG. 1 shows a schematic perspective view of an exemplary embodiment of the inventive transport container, with a schematic perspective view of an exemplary embodiment of the inventive aerial vehicle, which in an exemplary manner is shown as a transport drone.

FIG. 1 shows a first possible exemplary embodiment of an inventive system 1 for the transport of goods from one location to another location. The system 1 has a transport container 2, in which the goods to be transported can be arranged. Furthermore, the system 1 has an unmanned aerial vehicle 3, illustrated here as a transport drone 3.

The transport container 2 has a data storage device 4, and, connected to the data storage device 4 in a data transmitting manner, a data communications device 5 for exchanging data with a communications device of the transport drone 3. The data storage device 4 has a receipt data storage region, reserved for data representing a receiving location, where goods are to be received by the transport container 2. Alternatively or additionally, the data storage device has a destination data storage region reserved for data representing a destination to which the goods are to be brought.

The unmanned aerial vehicle 3, for example the transport drone 3, is configured to transport the transport container 2.

The unmanned aerial vehicle 3 has a data storage device 6 and, connected to the data storage device 6 in a data transmitting manner, a communications device 7 for exchanging data with the communications device 5 to be transported of the transport container 2 of the transport system 1, wherein the data storage device 6 has receipt data storage region reserved for data representing a receiving location, to which the unmanned aerial vehicle 3 is to fly for receiving goods. Alternatively or additionally, the data storage device 6 has a destination data storage region, which is reserved for data representing a destination to which the unmanned aerial vehicle 3 is to fly for purposes of delivery of the goods.

The communications devices 5, 7 can be configured to exchange data directly with each other. Alternatively, the communications devices 5, 7 can be configured to exchange data with each other via a transport logistics server.

At least one of the data storage devices 4, 6 can have a base data storage region in which data representing a base location, to which the transport container is to be returned after a delivery, or for which the goods are intended, are permanently stored. "Permanent" can mean that the data is not readily or possibly not at all erasable.

The unmanned aerial vehicle 3 can have a housing 8, which can be configured such that it closes an upper opening 9 of a transport container 3 attached to the unmanned aerial vehicle 3. At least one rotor 10 of the unmanned aerial vehicle 3 can be attached to the housing 8.

Figure 2:
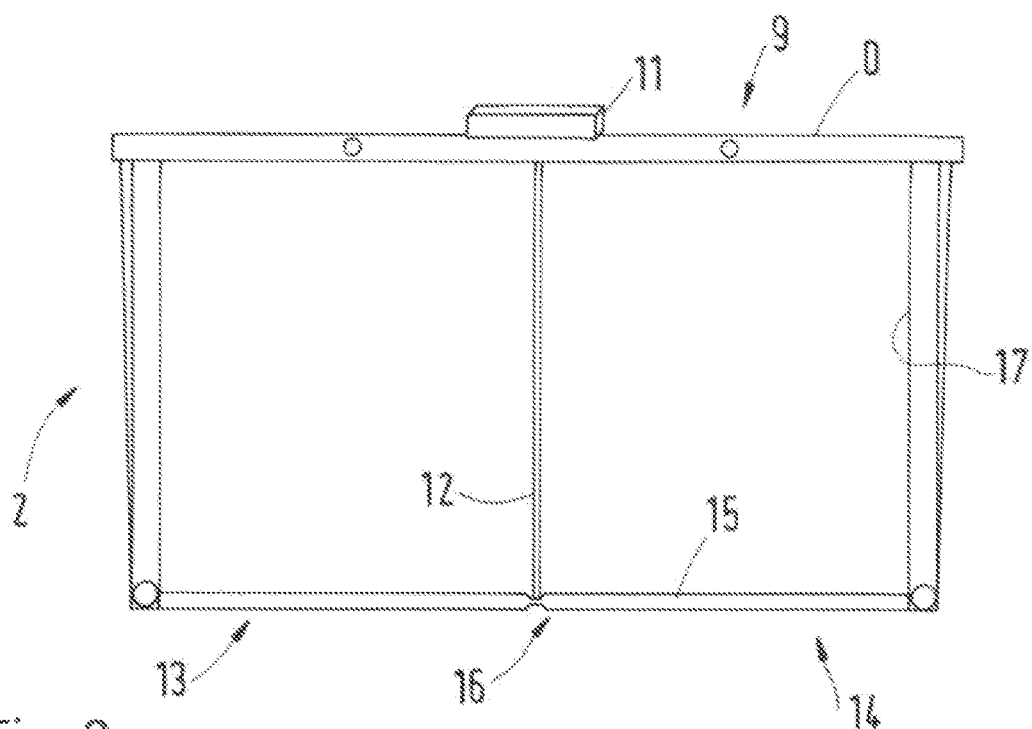
FIG. 2 shows a schematic side view of an exemplary embodiment of the inventive transport container.

FIG. 2 shows a further exemplary embodiment of the transport container 2 in a schematic cross-sectional view from the side. In what follows the same reference signs are used for elements that correspond in form or function to elements of the previous exemplary embodiment. In the interests of brevity, only the differences from the previous exemplary embodiment are discussed in what follows.

In the exemplary embodiment shown, the upper opening 9 is closed with a possibly detachable, or non-detachable, cover D. The cover D can be part of the transport container 2. The transport container 2 can have an attachment device 11 for the repeatedly releasable attachment of the transport container 2 to the unmanned aerial vehicle 3, whereby in FIG. 2 the attachment device is provided, in an exemplary manner, by the cover D. In particular, the attachment device 11 can be arranged on an outer or upper face of the cover 10 that faces away from the interior of the transport container 2.

The transport container 2 can have at least one partitioning element 12, with which the free volume inside the transport container can be divided into at least two sub-volumes partitioned from each other. The partitioning element 12 can, for example, be configured as a foldable wall, or as a roller shutter.

The transport container 2 can have a lower opening 13, through which goods can be dispensed from, or received by, the transport container 2. This opening 13 can be referred to as the removal opening.

For purposes of opening and closing the lower opening 13, the transport container 2 can have a closure device 14, which has, for example, a pivotable closing hatch. In the exemplary embodiment illustrated, however, the closure device 14 has a closure element 15 which can be moved parallel to the lower opening 13 in order to electively open or close the lower opening 13. The closure element 15 can be configured as a hinged floor. In the exemplary embodiment illustrated, however, the closure element 15 is configured as a roller shutter that can be moved parallel to the lower opening 13.

The closure element 15 can have a free edge 16, which can be configured to be essentially wedge-shaped. The wedge shape can be configured such that the outer face of the closure element 15, facing away from the interior of the transport container 2, at least in the closed state of the lower opening 13, including the wedge-shaped section, essentially forms a plane. The interior face of the closure element 15, facing into the interior of the transport container 2, can, at least in the region of the wedge-shaped section, be inclined, and can, for example, run away from the interior towards the free edge.

The closure device 14 can include a deflection element 16 that interacts with the closure member 15. The deflection element 16 can, for example, provide an axis, on which the closure element 15 can be rolled up. However, in the exemplary embodiment illustrated, the deflection element 16 transports the closure element 15 in its illustrated closure position, in which the closure element 15 closes the lower opening 13, into its opening position and vice versa. In the opening position, the lower opening 13 is freely accessible and the closure element 15 runs at least partially parallel to a lateral face 17.

Furthermore, the transport container 2 can have more than one closure element 15. For example, the transport container 2 can have two closure elements 15, which can be moved along the lower opening 13 in a common plane. The free edges 16 of the two closure elements 15 can, in a closed state of the lower opening 13, be arranged essentially at the centre of the lower opening 13. Alternatively, in a closed state of the lower opening 13, the free edges 16 of the two closure elements 15 can contact the partitioning element 12 when it is arranged in its partitioning position, in which it separates the interior free volume into sub-volumes. The free edges 16 of at least one of the closure elements 15, and preferably of both closure elements 15, can be configured to be wedge-shaped.

The transport container 2 can have a control device, which is configured to electively control the closure device 14 such that it fixedly closes or releases the removal opening. For example, the closure device 14 is motor-driven and the motor of the closure device 14 is connected to the control device in a control signal transmitting manner.

Figure 3:
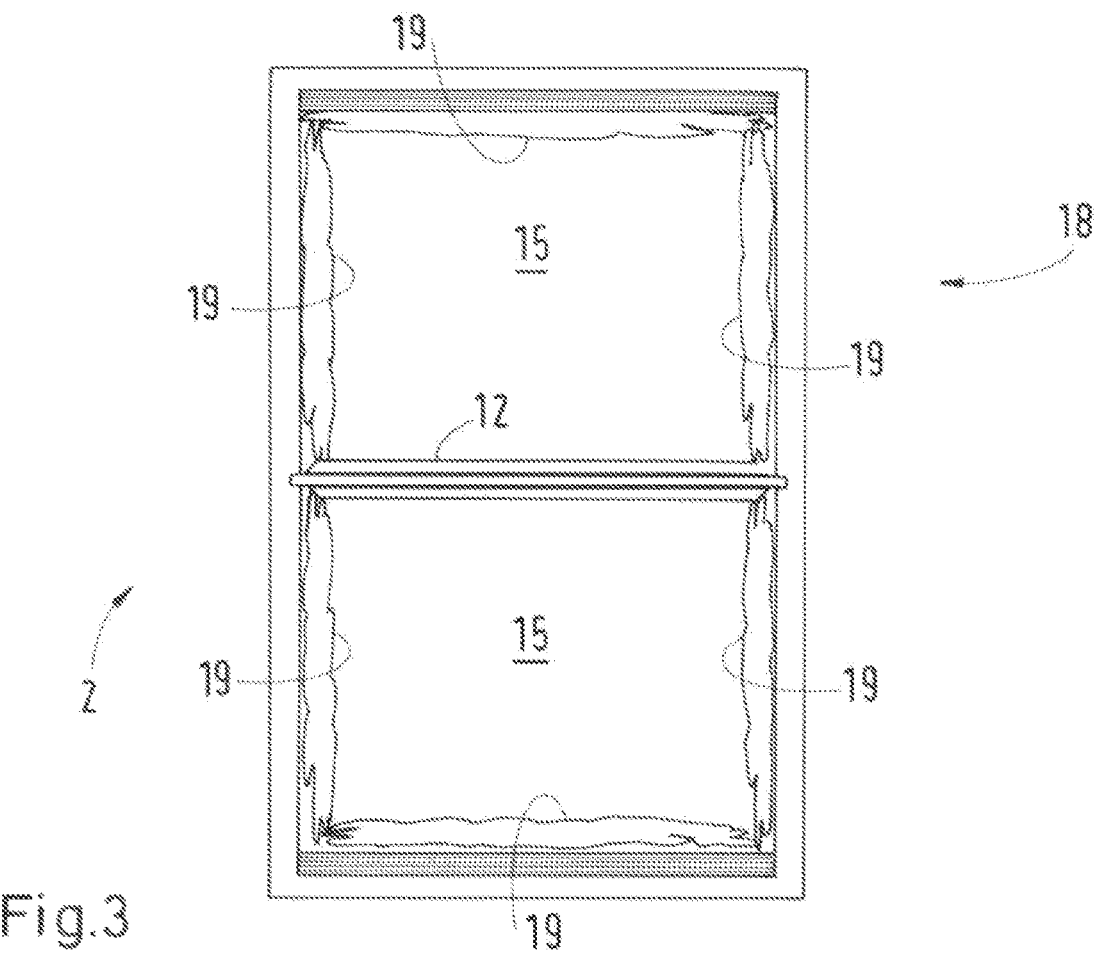
FIG. 3 shows a schematic plan view onto the bottom of an exemplary embodiment of the inventive transport container.

FIG. 3 shows the exemplary embodiment of FIG. 2 in a plan view and without the cover D.

The transport container 2 can have a goods security device 18 for purposes of securing goods in the free volume against unintentional shifting. By this means transport damage can, for example, be prevented. The goods security device 18 can be arranged in the free volume of the transport container 2.

The goods security device 18 can be elastically resilient, and/or soft, and can, for example, be formed as an air cushion 19 that may possibly be inflated by the transport container. In the context of the present disclosure, an air cushion can be an element, for example a bag, which can be inflated with air.

The transport container 2 can have a plurality of goods security devices 18, which can be provided on opposing interior faces of the transport container 2. Optionally, one of the goods security devices 18 can be attached to the attachment device 11.

The control device can be connected to the goods security device 18 in a control signal transmitting manner, in order to activate the goods security device 18 when required, that is to say, for example, in order to initiate the inflation of the air cushion.

Figure 4:
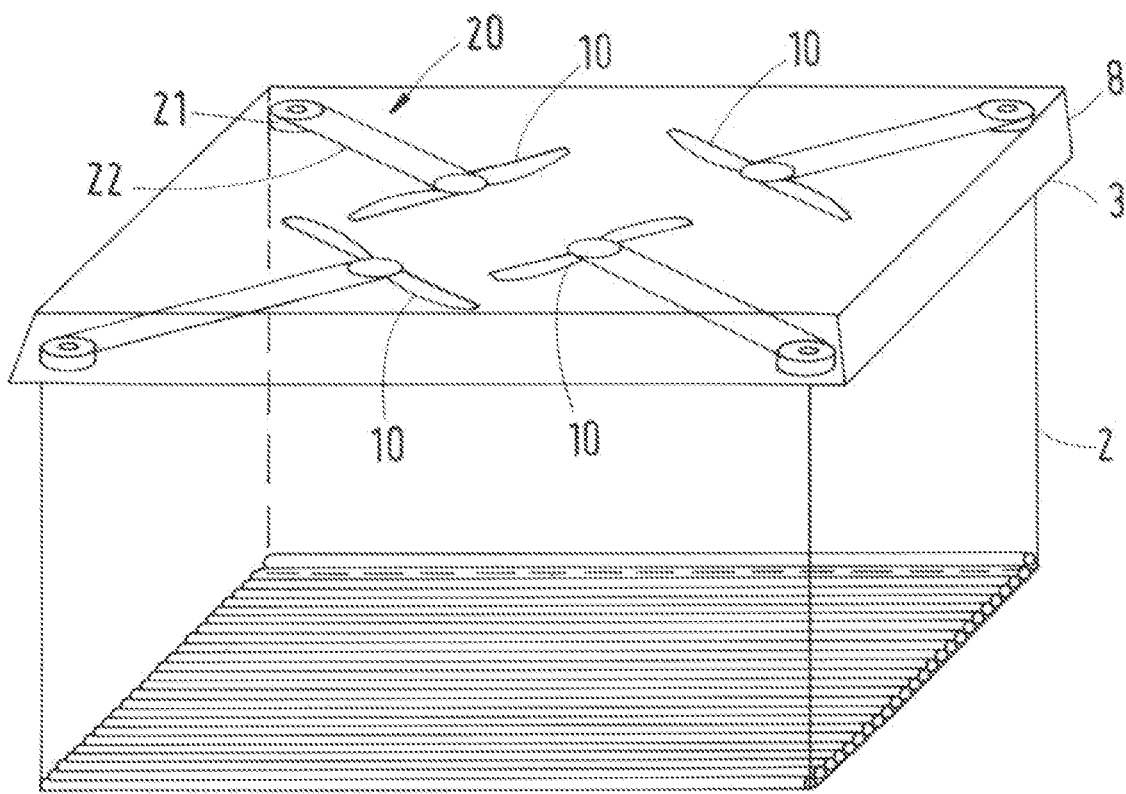
FIG. 4 shows a schematic perspective view of an exemplary embodiment of the inventive transport container, with a schematic perspective view of an exemplary embodiment of the inventive transport drone.
Figure 5:
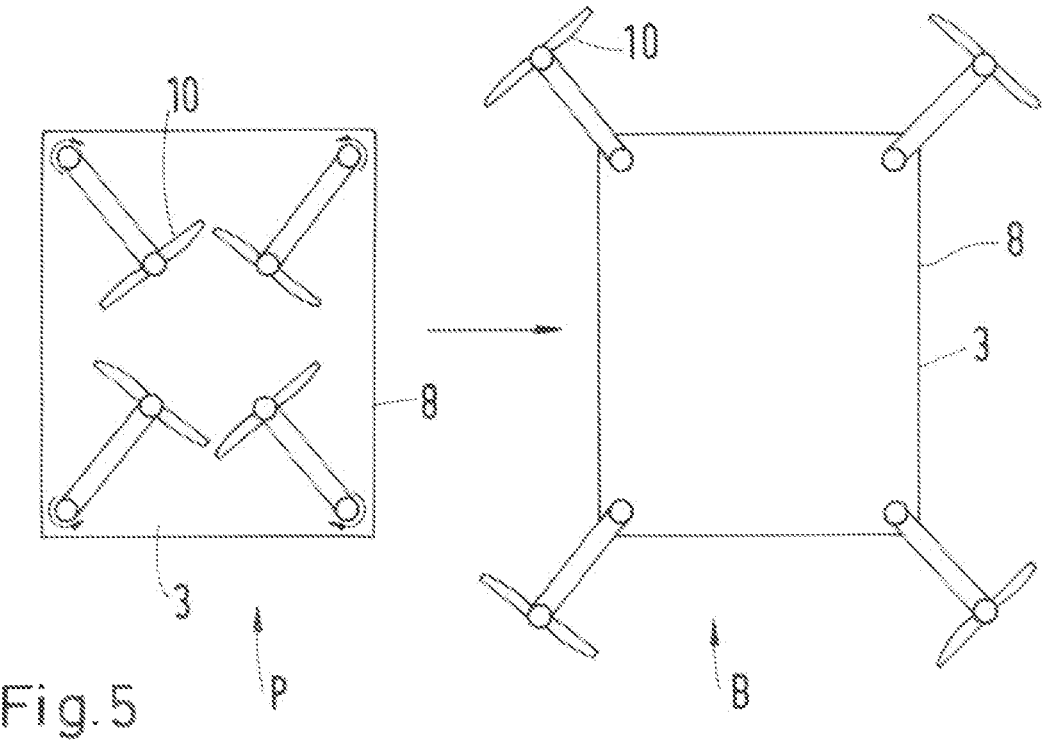
FIG. 5 shows schematic views of the transport drone of the exemplary embodiment of FIG. 4.

FIGS. 4 and 5 show in different views a further exemplary embodiment of the unmanned aerial vehicle 3, and a further exemplary embodiment of the transport container 2. For elements that correspond in form or function to elements of the previous examples of embodiment, the same reference signs are used in what follows. In the interests of brevity, only the differences from the previous examples of embodiment are discussed in what follows.

In FIGS. 4 and 5, the aerial vehicle 3 is configured as a cover for purposes of closing the upper opening 9, as a result of which the cover D is no longer necessary. However, the aerial vehicle 3 of FIGS. 3 to 5 can also be configured such that it can be attached to the attachment device 11 of the cover 10.

The aerial vehicle 3 can have a movement mechanism 20 that can be connected to the at least one rotor 10 in a movement transmitting manner. If the aerial vehicle 3 has a plurality of rotors 10, the movement mechanism 20 can be connected to a plurality of, or all of, the rotors 10 in a movement transmitting manner. Alternatively, if the aerial vehicle 3 has a plurality of rotors 10, the aerial vehicle 3 can have a plurality of movement mechanisms 20, which in each case are connected to at least one of the rotors 10 in a movement transmitting manner. The movement mechanism 20 can be a movement mechanism 20 moving the rotor 10, or the rotors 10, linearly, or can be a pivoting mechanism that pivots the rotor 10, or the rotors 10. In the exemplary embodiment illustrated, the movement mechanism 20 is, for example, configured as a pivoting mechanism. If the movement mechanism 20 is configured to move the rotor 10 or the rotors 10 linearly, the movement mechanism 20 can, for example, be telescopic, or configured with articulations.

The pivoting mechanism can have a pivot bearing 21 and a pivot arm 22. The pivot bearing 21 can be arranged in or on the aerial vehicle 3 such that it cannot be translated. The pivot bearing 21 can be arranged at one end of the pivot arm 22, and the rotor 10 can be arranged at the opposite end of the pivot arm 22. The pivot bearing 21 can enable the pivot arm 22 to pivot about a pivot axis, whereby in the exemplary embodiment of FIGS. 4 to 5 the pivot axis can run perpendicular to an upper face of the aerial vehicle 3 that faces away from the transport container 2, perpendicular to the upper opening 9, and/or parallel to at least one of the lateral faces 17 of the transport container 2. The pivot arm 21 can be pivoted in a plane that can be parallel to, or perpendicular to, the upper face of the aerial vehicle 3 that faces away from the transport container 2, parallel to, or perpendicular to, the upper opening 9, and/or parallel to, or perpendicular to, at least one of the lateral faces 17 of the transport container 2.

FIG. 5 shows the transition of the rotors 10 from a rest position P to an operating position B. In their rest position P, the rotors 10 are arranged in the housing 8. In their operating position B, the rotors 10 are pivoted completely out of the housing 8.

Figure 6:
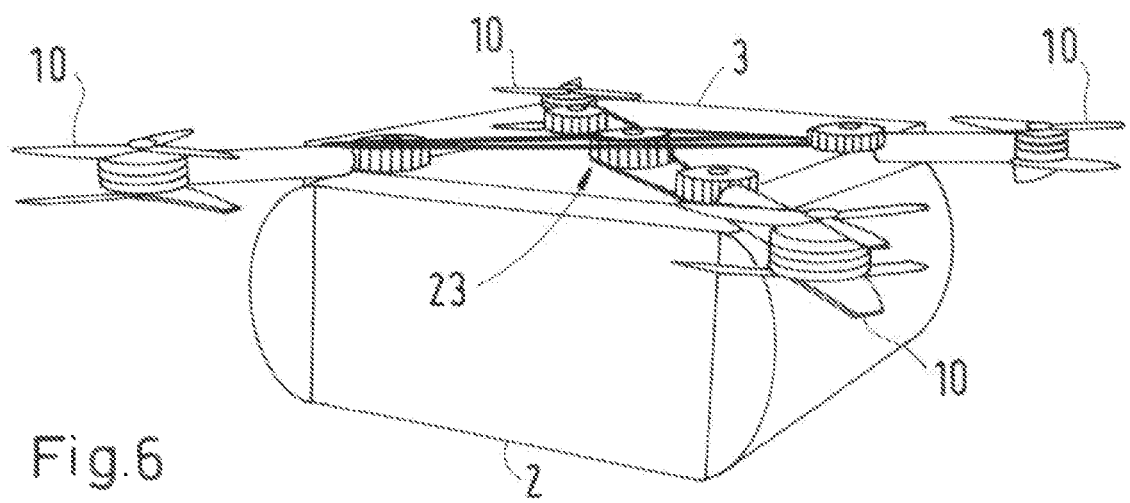
FIG. 6 shows a partially transparent perspective view of the transport container and the transport drone of the exemplary embodiment of FIG. 4.
Figure 7:
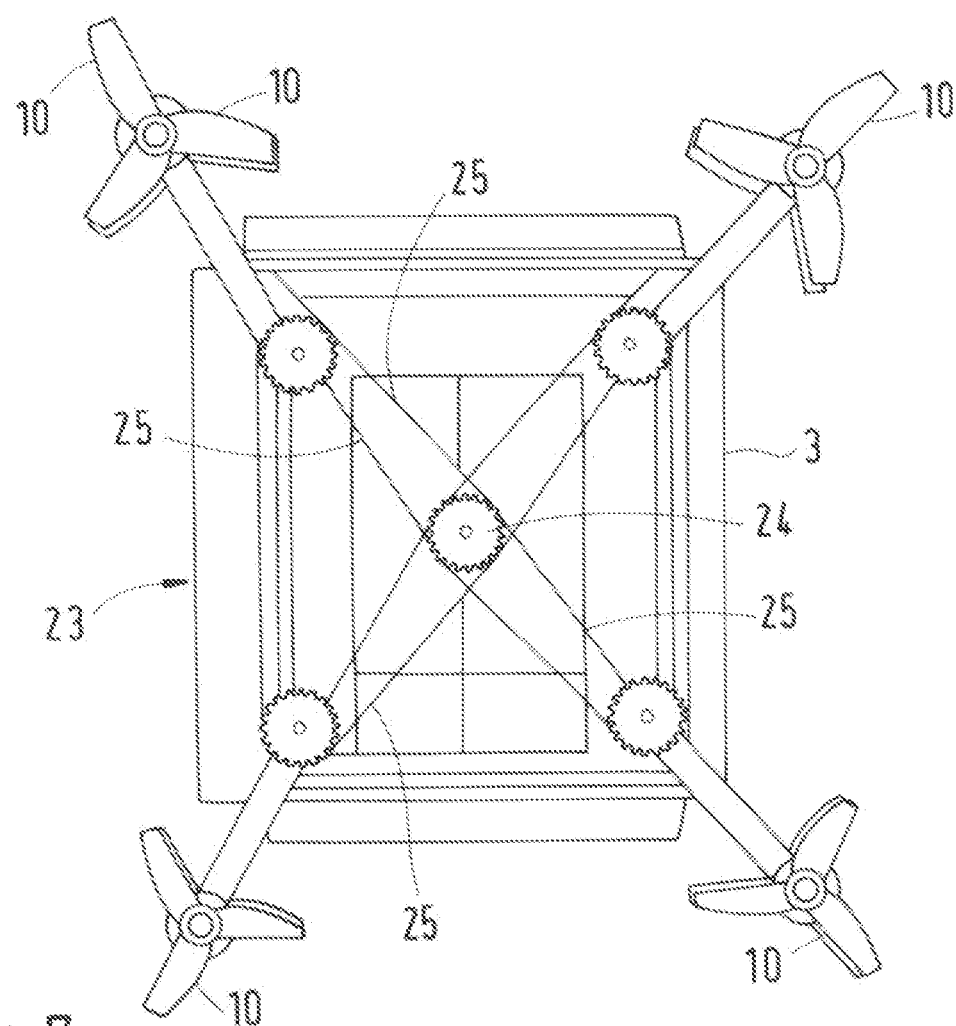
FIG. 7 shows a partially transparent plan view of the transport drone of the exemplary embodiment of FIG. 4.

FIGS. 6 and 7 show a further exemplary embodiment of the pivoting mechanism. For elements that correspond in form or function to elements of the previous example of embodiment, the same reference numerals are used in what follows. In the interests of brevity, only the differences from the previous exemplary embodiment are discussed in what follows.

FIGS. 6 and 7 show the aerial vehicle 3 with the transport containers 2 in transparent views. The pivoting mechanism of FIGS. 6 and 7 has additionally comprises a pivot unit 23, which is connected to a plurality of, or all of, the rotors 10 in a movement transmitting manner. The pivoting unit 23 can be motor-driven, and can be connected to the control device, in a control signal transmitting manner, in order automatically to transfer the rotors 10 from their rest position P into their operating position B, and/or vice versa. The pivot unit 23 has, for example, a drive pinion 24, which is connected, in each case by way of a belt 25, to one of the pivot bearings 21, in a movement transmitting manner.

Figure 8:
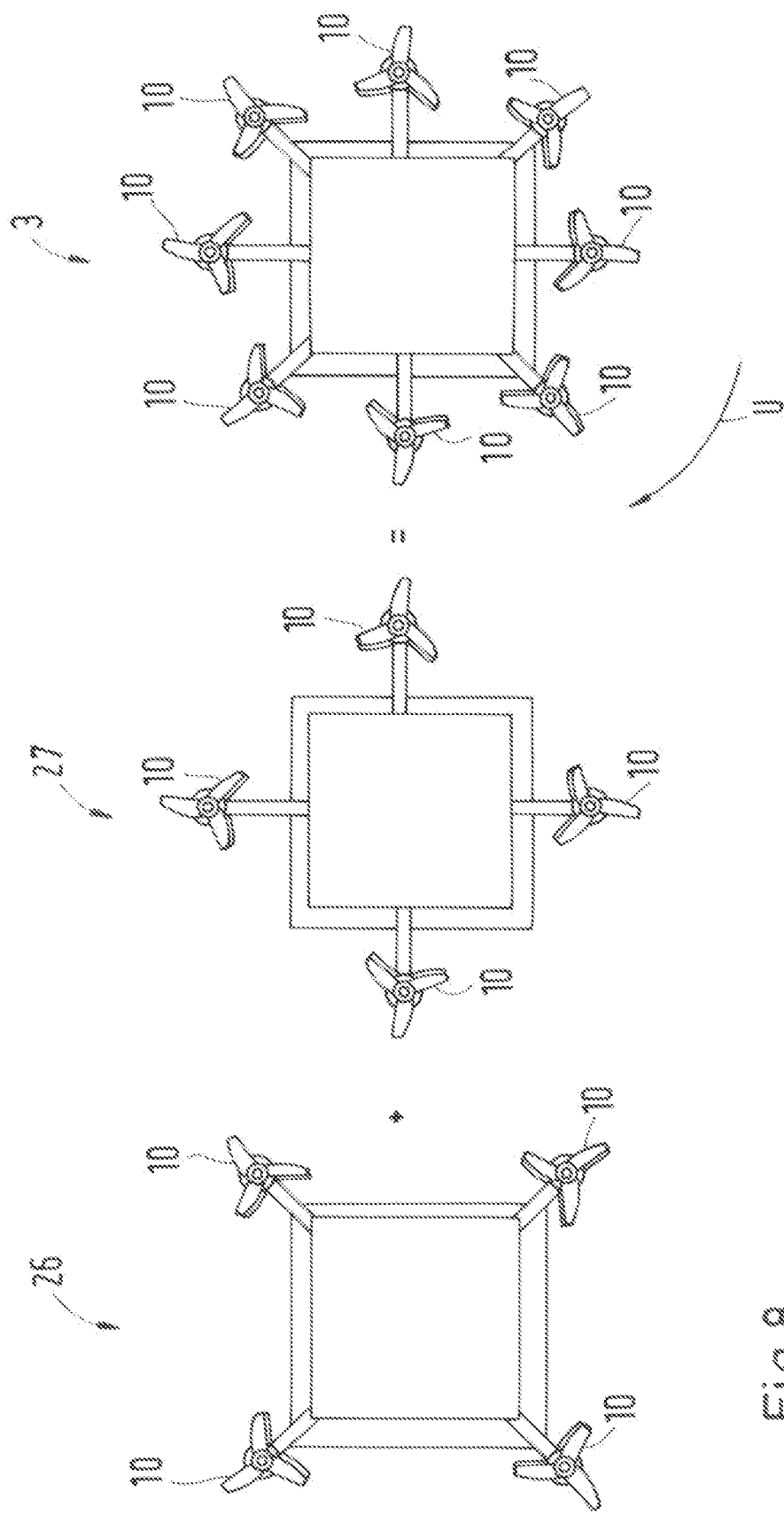
FIG. 8 shows schematic views of the transport container and the transport drone of the exemplary embodiment of FIG. 4 in various stages of loading and assembly.
Figure 9:
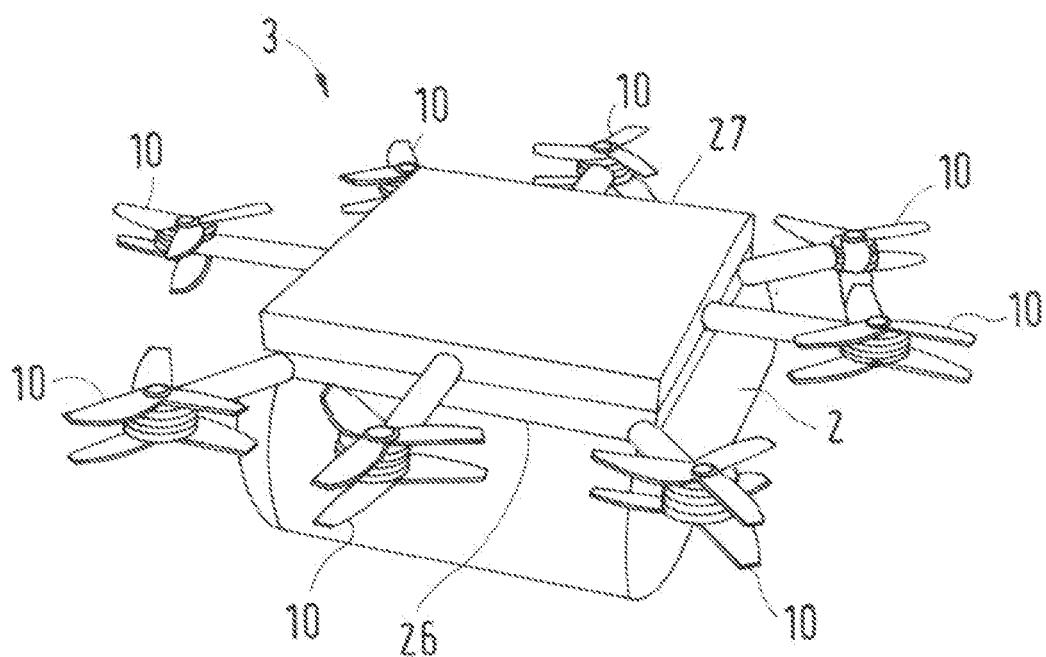
FIG. 9 shows a schematic perspective view of an exemplary embodiment of the inventive transport container, with a schematic perspective view of an exemplary embodiment of the inventive transport drone.

FIGS. 8 and 9 show a further example of embodiment of the aerial vehicle in different views. For elements that correspond in form or function to elements of the previous examples of embodiment, the same reference numerals are used in what follows. In the interests of brevity, only the differences from the previous exemplary embodiments are discussed in what follows.

The unmanned aerial vehicle 3 can have a plurality of aerial sub-vehicles 26, 27, for example, two aerial sub-vehicles 26, 27, which can be operated independently of each other, and coupled to each other, in each case having at least one rotor 10. The at least one rotor 10 of one of the aerial sub-vehicles 26 can, in a coupled state of the aerial sub-vehicles 26, 27, be arranged offset relative to the rotor 10 of the other of the aerial sub-vehicles 27, such that the rotors 10 rotate contact-free during operation of the unmanned aerial vehicle 3. In particular, the rotors 10 of one aerial sub-vehicle 26 can be offset relative to the rotors 10 of the other aerial sub-vehicle 27 along a radial direction R or along a circumferential direction U of the unmanned aerial vehicle 3. The circumferential direction U circulates around the aerial vehicle 3. The radial direction R points away from the aerial vehicle 3. In the exemplary embodiment of FIG. 8, the rotors 10 of one of the aerial sub-vehicles 26 are offset by 45° relative to the rotors 10 of the other aerial sub-vehicle 27.

Figure 10:
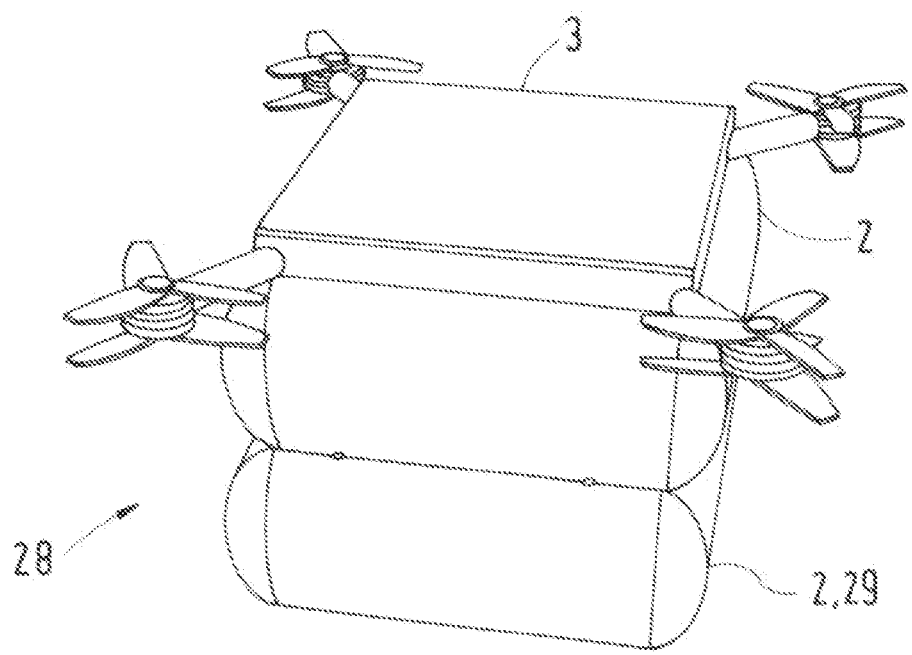
FIG. 10 shows a schematic perspective view of an exemplary embodiment of the inventive transport container, with a schematic perspective view of an exemplary embodiment of the inventive transport drone.

FIG. 10 shows an exemplary embodiment of a transport container assembly with one of the aerial sub-vehicles 26, 27 of the previous exemplary embodiment, whereby the aerial sub-vehicle in the exemplary embodiment of FIG. 10 can be operated without another aerial sub-vehicle, and is thus shown as aerial vehicle 2. For elements that correspond in form or function to elements of the previous exemplary embodiments, the same reference signs are used in what follows. In the interests of brevity, only the differences from the previous exemplary embodiments are discussed in what follows.

The transport container assembly 28 can be composed of a plurality of transport sub-containers 2. For this purpose, the transport containers 2 can have an attachment section, which is configured such that a mating attachment section of a further transport container 2 can be repeatedly releasably attached to the attachment section. The attachment section has, for example, a latching device, or a gripping device, and the mating attachment section has a mating latching device, or a mating gripping device.

Thus a plurality of transport containers 2 can be coupled or attached to one another, that is to say, connected to one another in a movement transmitting manner, for example, whereby the coupled or attached transport containers 2 can be moved together with an aerial vehicle 3, or with a plurality of aerial sub-vehicles 26, 27 that are coupled to one another. By this means the total available loading volume can be increased. Each of the transport containers 2 coupled or attached to each other can, for example, comprise a loading volume that is separate from the loading volume of at least one other coupled or attached transport container 2. Alternatively or additionally, at least selected members of the transport containers 2 coupled or attached to each other can provide a common and/or continuous loading volume, so as to be able to transport goods that would be too large to be able to be transported in one of the transport containers. In order to connect individual loading volumes continuously with each other, the closure element 15 of one of the transport containers 2 can be opened, if a further transport container 2, the upper opening of which is open, is connected to its lower opening 13.

Each transport container 2 of the exemplary embodiments can be combinable with any of the aerial vehicles 2 of the exemplary embodiment, or aerial sub-vehicles 26, 27 of the exemplary embodiments, or with another transport container 2 of the exemplary embodiments.

Instead of the lower transport container 2, or underneath the lower transport container 2, an inventive goods station 29 could be provided in FIG. 10, to or from which goods are to be delivered or collected.

Furthermore, selected method steps of a possible exemplary embodiment of the inventive method are reproduced in what follows, without describing in detail other possible method steps, already cited before the figure descriptions, in order to avoid redundant descriptions.

Figure 11:
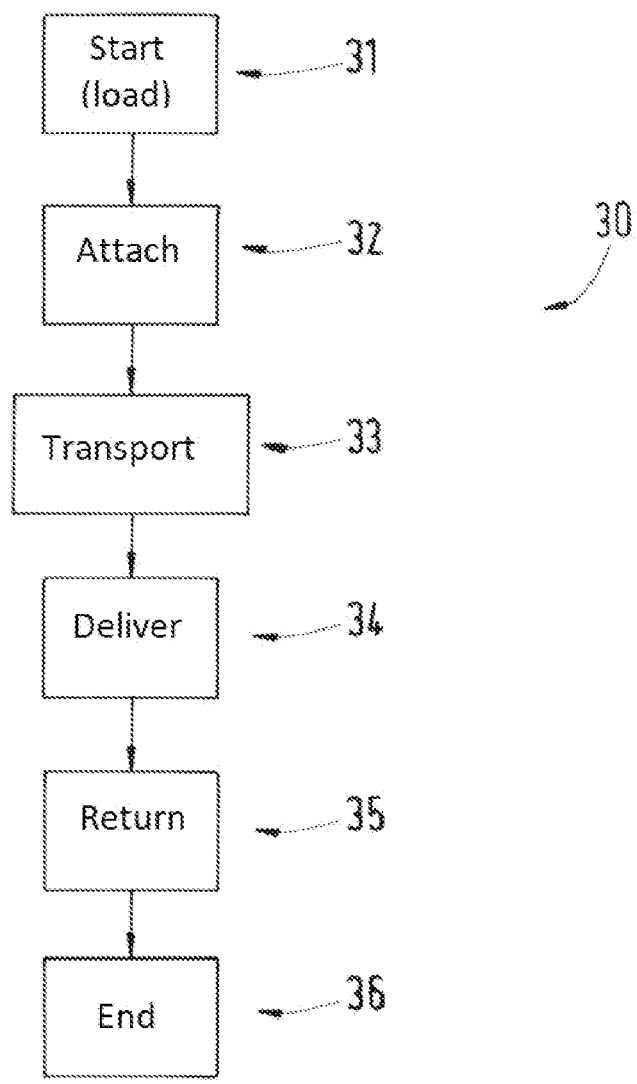
FIG. 11 shows a schematic representation of the inventive method as a flow chart.

FIG. 11 shows the method according to the invention schematically as a flow chart. In what follows the same reference signs are used for elements that serve to explain the process and correspond in form or function to elements of the previous exemplary embodiments. In the interests of brevity, only the differences from the previous exemplary embodiments are discussed in what follows.

The method 30 for the transport of goods from a receiving location to a destination starts with a first method step 31. For example, in the first method step 31, goods to be transported are arranged in the transport container 2 at the receiving location. In a further method step 32, the transport container 2 can be attached to the aerial vehicle 3. Then, in the following method step 33, the transport container 2 is transported to the destination by the unmanned aerial vehicle 3. In method step 34, the goods can be delivered to, or released at, the destination. If the goods are delivered to an automated goods station, the transport container and/or the aerial vehicle can communicate with the goods station. For example, this communication can take place during the approach to the goods station, that is to say, when e.g. landing is imminent. In particular, the communication can take place before the delivery/receipt of the goods. In the course of the communication, authentication data can be exchanged, which, for example, identify the goods station as the intended recipient of the goods. Thereafter, in method step 35, the aerial vehicle 3 can return the transport container 2 to the receiving location, for example to deliver returned products, and/or to receive further goods that are to be transported. The method can end with the arrival at the acquisition location in method step 36.

As an alternative to the sequence as described, the transport drone 2 can first transport the transport container to the receiving location, when, for example, goods are to be acquired.

LIST OF REFERENCE SYMBOLS

1 System
2 Transport container

3 Aerial vehicle
4, 6 Data storage device
7 Communications device
8 Housing
9 Upper opening
10 Rotor
11 Attachment device
12 Partitioning element
13 Lower opening
14 Closure device
15 Closure element
16 Deflection element
17 Lateral face
18 Goods security device
19 Air cushion
20 Movement mechanism
21 Pivot mounting
22 Pivot arm
23 Pivot unit
24 Drive pinion
25 Belt
26, 27 Aerial sub-vehicle
28 Transport container assembly
29 Goods station
30 Method
31 Start (arrange/load goods in transport container)
32 Attach transport container to the aerial vehicle
33 Transport goods to the destination
34 Deliver goods
35 Return
36 End
B Operating position
D Cover
U Circumferential direction
R Radial direction
P Rest position

The invention claimed is:

1. A transport container for a system for the transport of goods, comprising:
a transport container configured to acquire the goods to be transported
a data storage device, and
a communications device, connected to the data storage device in a data transmitting manner, wherein the communications device is capable of exchanging data with a communications device of an unmanned aerial vehicle of a transport system,
wherein the data storage device comprises at least one of a receipt data storage region and a destination data storage region, wherein the receipt data storage region is reserved for data representing a receiving location, where goods are to be received by the transport container, and the destination data storage region is reserved for data representing a destination to which the goods are to be brought, and
wherein the transport container comprises at least one partitioning element, with which the free volume of the transport container can be divided into at least two sub-volumes partitioned from each other, wherein the transport container is configured to position the partitioning element automatically so as to partition predefined compartments in the transport container from each other.

2. The transport container according to claim 1, wherein the communications device is configured to exchange data with a communications device of an unmanned aerial vehicle directly.

3. The transport container according to claim 1, wherein the communications device is configured to exchange data with a communications device of an unmanned aerial vehicle via a transport logistics server.

4. The transport container according to claim 1, wherein the data storage device further comprises a base data storage region, in which data representing a base location, to which the transport container is to be returned after a delivery, are permanently stored.

5. The transport container according to claim 1, wherein the data storage device further comprises a base data storage region, in which data representing a base location, for which the goods are intended, are permanently stored.

6. The transport container according to claim 1, wherein the transport container further comprises an attachment device for repeatedly releasable attachment of the transport container to an unmanned aerial vehicle.

7. The transport container according to claim 1, wherein the transport container further comprises a removal opening, a closure device, and a control device, wherein the control device is configured electively to control the closure device, such that it fixedly closes and releases the removal opening.

8. The transport container according to claim 7, further comprising a shutter device which is motor-driven, and the motor of the shutter device is connected to the control device in a control signal transmitting manner.

9. The transport container according to claim 1, wherein the transport container further comprises a goods security device for securing goods arranged in the transport container.

10. A system for the transport of goods, comprising:
at least one transport container according to claim 1, and
at least one unmanned aerial vehicle comprising;
a data storage device, and, connected to the data storage device in a data transmitting manner, a communications device for exchanging data with a communications device of a transport container of the transport system that is to be transported,
wherein the data storage device comprises at least one of a receipt data storage region reserved for data representing a receiving location, to which the unmanned aerial vehicle is to fly for purposes of the receipt of goods, and a destination data storage region that is reserved for data that represent a destination, to which the unmanned aerial vehicle is to fly for purposes of delivery of the goods.

11. A method for the transport of goods from a receiving location to a destination, comprising:
arranging the goods in a transport container at the receiving location and transporting transport container to the destination by an unmanned aerial vehicle,
wherein the transport container is a transport container according to claim 1.

12. The transport container according to claim 1, wherein the partitioning element is partitioning element is a foldable wall or roller shutter.

13. An unmanned aerial vehicle for a transport system for the transport of goods, wherein the unmanned aerial vehicle is configured to transport a transport container for the goods, the unmanned aerial vehicle comprising:
a transport container configured to acquire the goods to be transported, the transport container comprising at least one partitioning element, with which the free volume of the transport container can be divided into at least two sub-volumes partitioned from each other, wherein the transport container is configured to position the partitioning element automatically so as to partition predefined compartments in the transport container from each other, a data storage device, and a communications device, connected to the data storage device in a data transmitting manner, wherein the communications device is capable of exchanging data with a communications device of a transport container of the transport system that is to be transported by the transport system, wherein the data storage device comprises at least one of a receipt data storage region reserved for data representing a receiving location, to which the unmanned aerial vehicle is to fly for purposes of the receipt of goods, and a destination data storage region that is reserved for data that represent a destination, to which the unmanned aerial vehicle is to fly for purposes of delivery of the goods, and wherein the unmanned aerial vehicle comprises at least two aerial sub-vehicles, that are operable independently of one another, and couplable to one another, in each case having at least one rotor, wherein in a coupled state of the aerial sub-vehicles the rotor of one of the aerial sub-vehicles is arranged offset relative to the rotor of the other of the aerial sub-vehicles, such that the rotors rotate without making contact during operation of the unmanned aerial vehicle.

14. The unmanned aerial vehicle according to claim 13, wherein the communications device of the unmanned aerial vehicle is configured to exchange data with a communications device of the transport container directly.

15. The unmanned aerial vehicle according to claim 13, wherein the communications device of the unmanned aerial vehicle is configured to exchange data with a communications device of the transport container via a transport logistics server.

16. The unmanned aerial vehicle according to claim 13, wherein the data storage device comprises a base data storage region, in which data representing a base location, to which the unmanned aerial vehicle is to return after a delivery, are permanently stored.

17. The unmanned aerial vehicle according to claim 13, wherein the data storage device comprises a base data storage region, in which data representing a base location, to which the unmanned aerial vehicle is to transport the goods, are permanently stored.

18. The unmanned aerial vehicle according to claim 13, wherein the unmanned aerial vehicle comprises at least one rotor that is provided on a movement mechanism, wherein the movement mechanism can be moved with the rotor from an operating position to a rest position and vice versa, and wherein the rotor is arranged in its rest position in a housing of the unmanned aerial vehicle.

19. The unmanned aerial vehicle according to claim 18, wherein the housing is configured to close and release an upper opening of a transport container attached to the unmanned aerial vehicle.

20. A method for the transport of goods from a receiving location to a destination, comprising:

arranging the goods in a transport container at the receiving location and transporting the transport container to the destination by an unmanned aerial vehicle, wherein the unmanned aerial vehicle is an unmanned aerial vehicle according to claim 13.

21. The unmanned aerial vehicle according to claim 13, wherein the unmanned aerial vehicle comprises a plurality of rotors connected to a pivot unit in a movement transmitting manner.

22. A goods station for a system for the transport of goods, wherein the goods station is configured for the receipt of goods, wherein the goods station comprises:

a data storage device, and, connected to the data storage device in a data transmitting manner, a communications device for exchanging data with a communications device of at least one of a transport container and of an unmanned aerial vehicle of the system, wherein the data storage device of the goods station comprises an authentication data storage region reserved for authentication data identifying the goods station to the at least one of the transport container and the aerial vehicle as the recipient of the goods, and wherein the transport container comprises at least one partitioning element, with which the free volume of the transport container can be divided into at least two sub-volumes partitioned from each other, wherein the transport container is configured to position the partitioning element automatically so as to partition predefined compartments in the transport container from each other.

* * * * *